United States Patent [19]

Sood et al.

[11] 3,979,155
[45] Sept. 7, 1976

[54] FLEXIBLE DAMPED BEARING SUPPORT

[75] Inventors: Vijay K. Sood, Murrysville, Pa.; Keith L. Streifert, Duanesburg, N.Y.

[73] Assignee: Carrier Corporation, Syracuse, N.Y.

[22] Filed: Oct. 3, 1975

[21] Appl. No.: 619,325

[52] U.S. Cl.................................... 308/15; 308/26; 308/28
[51] Int. Cl.²......................................... F16C 35/08
[58] Field of Search............... 308/15, 9, 26, 22, 27, 308/28

[56] References Cited
UNITED STATES PATENTS

| | | |
|---|---|---|
| 3,263,907 | 8/1966 | Van Nimwegen et al. ........ 308/26 X |
| 3,473,853 | 10/1969 | Goss et al. ............................ 308/15 |
| 3,877,762 | 4/1975 | Dennison ............................ 308/15 |
| 3,907,386 | 9/1975 | Kasmarik et al. ..................... 308/15 |

Primary Examiner—M. H. Wood, Jr.
Assistant Examiner—Gene A. Church
Attorney, Agent, or Firm—J. Raymond Curtin; Thomas J. Wall

[57] ABSTRACT

A flexible damped bearing for rotatably supporting a shaft within a machine including at least one helper spring mounted below the shaft and being arranged to act against the bearing to support the weight of the shaft and thus eliminate the effect of static preloading on the bearing system.

8 Claims, 2 Drawing Figures

FLEXIBLE DAMPED BEARING SUPPORT

BACKGROUND OF THE INVENTION

This invention relates to a flexible damped bearing and, in particular, to means for supporting the dead weight of the rotor within the bearing system.

A flexible damped bearing concept for overcoming instability in a rotor assembly of an engine is disclosed in NASA Technical Note D-7892, published February 1975, and in U.S. Pat. No. 3,456,992, to Kulina. As disclosed by Kulina, the shaft of a turboengine is rotatably supported within the engine frame by means of a roller bearing. The bearing, in turn, is mounted within a movable support member that is suspended from the engine frame via a series of flexure springs. The flexure spring support provides the bearing assembly with a mechanical response which attenuates the harmful effects of shaft vibrations. A fluid film is also established between the flexible mounted bearing support and the engine frame which serves to dampen the system's response to shaft induced vibrations.

Difficulties have been encountered when applying the flexible damped bearing concept to heavy rotary machines, such as turbines and compressors. For the bearing to react in a controlled manner, it is essential that the bearing components be assembled in axial alignment with the shaft to preserve the uniformity of the squeeze film and insure that the flexure springs react symmetrically. In most rotary machines, however, the heavy rotor structure is suspended horizontally within the machine frame and the dead weight of the rotor exerts a high static preload upon the bearing system which, in turn, places a nonuniform stress on the bearing. Under these conditions, proper alignment of the bearing components in assembly becomes difficult.

SUMMARY OF THE INVENTION

It is therefore an object of the present invention to improve flexible damped bearings.

A still further object of the present invention is to reduce the adverse effects of a heavy rotor upon a flexible damped bearing.

Another object of the present invention is to facilitate the mounting of a flexible damped bearing in a rotary machine.

These and other objects of the present invention are attained by means of a journal bearing rotatably supporting a horizontally aligned rotor structure, a movable member for supporting the bearing within a stationary frame, a flexible spring arrangement for suspending the movable member from the frame and centering the bearing in respect to the shaft, a uniform fluid squeeze film interposed between the frame and the movable housing for damping the bearing response, and at least one helper spring positioned below the centerline of the shaft being arranged to act upon the movable member for supporting the dead weight of the rotor structure.

BRIEF DESCRIPTION OF THE DRAWING

For a better understanding of the present invention, as well as other objects and further features thereof, reference is had to the following detailed description of the invention to be read in connection with the accompanying drawing, wherein.

DESCRIPTION OF THE PREFERRED EMBODIMENT

Figures 1, 2:
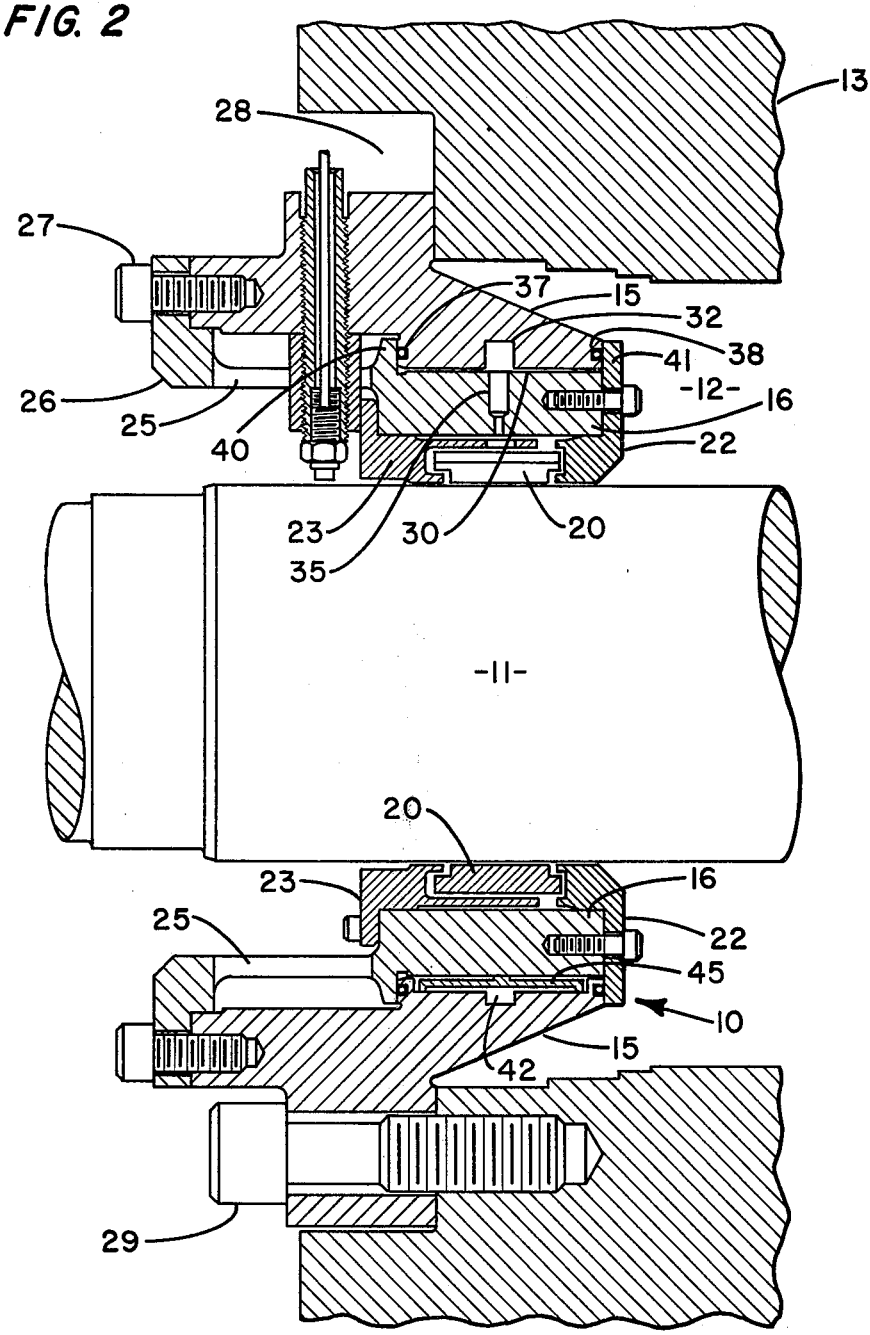
FIG. 1 is a partial side elevation in section of a rotary machine illustrating a rotor shaft supported within a flexible damped bearing and further embodying a helper spring for offsetting the weight of the rotor structure.
FIG. 2 is an enlarged view in section illustrating the helper spring shown in FIG. 1.

Referring now to FIG. 1, there is illustrated a flexible damped bearing assembly 10, embodying the teachings of the present invention, which is arranged to support a shaft 11 of a rotary machine within an opening 12 formed in the end wall 13 thereof. It should be understood that the rotary machine can take any form, such as a turbine or a compressor, having its rotary components mounted upon a generally horizontally extended shaft or any other arrangement where the rotor is capable of exerting a relatively high static load upon the bearing. The bearing assembly includes an outer stationary housing 15 having an annular opening centrally located therein in which is carried a cylindrical movable member 16. A series of tilt shoe bearings 20 are movably mounted upon rocker pads (not shown) within the movable member and the shaft journaled for rotation within the tilt shoes. Although a tilt shoe bearing is employed in the preferred embodiment of the present invention, it should be understood that any suitable bearing can be similarly employed herein without departing from the teachings of the present invention. A pair of end covers 22, 23 are affixed to the movable member, the inner surfaces of which are arranged to enclose the tilt shoe and rocker pads in assembly.

The movable member 16 is resiliently supported within the bearing housing upon a series of axially extended flexure springs 25 equally spaced about the body of the member. The springs 25 terminate in a bolting ring 26 that is secured to the left-hand end face of the housing, as seen in FIG. 1, by means of bolts 27, or the like. The housing, in turn, is carried within an annular opening 28 formed in the end wall and rigidly held in place via bolts 29.

In assembly, a uniform annular squeeze film cavity 30 is established between the outer periphery of the moving member 16 and the interior wall of the opening contained within the housing 15. Fluid, under a pressure which is high enough to prevent rupturing of the squeeze film due to the velocity-dependent dynamic forces produced during machine operations, is delivered into the cavity via an annular chamber 32 formed within the stationary housing. In operation, the high pressure fluid is bled from the cavity by metering ports 35 and passed into the tilt shoe region where it is further utilized to create a hydrodynamic wedge between the shoes and the shaft.

To seal the squeeze film cavity against unwanted leakage, a pair of O-rings 37, 38 are provided which are located outside of the squeeze film cavity. The seals are arranged to be carried within annular grooves machined or otherwise formed in two opposed radially extended side walls of the bearing housing. A pair of radially extended flanges 41, 40, carried upon the movable member 16, overlie the side walls of the bearing housing and act against the O-rings to establish a fluid-tight seal therebetween. The compressive sealing force of each seal is exerted generally perpendicular to the direction of movement of member 16 and thus has little effect upon the horizontal damping forces involved. By the same token, locating the seals outside of the cavity prevents the seals from being further compressed by the movable member as it moves radially in compliance with the shaft as the shaft deflects under vibration induced loads. As a result, the seals do not interact with the damping provided by the fluid film thus permitting the damping film to respond in a predetermined manner over a wide range of operating frequencies. Furthermore, the seals may be constructed of a material having a relatively low surface tension, such as Teflon, thus minimizing the amount of friction development between the seal and the radially extended flanges.

It should be understood that the resilient flexure springs and the fluid squeeze film are designed to provide both radial stiffness and damping to the bearing assembly whereby the bearing is capable of responding to shaft vibrations to alleviate the harmful effects thereof. It is important for the proper operation of the flexible damped bearing, that the bearing has the ability to respond uniformly about the entire periphery of the shaft. To maintain such a uniform and symmetrical response, it is essential that each of the equally spaced flexure springs react at about the same rate for a given shaft induced load. Similarly, to provide uniform damping about the bearing, it is also necessary to preserve the uniformity of the squeeze film maintained between the movable member and the stationary housing. When the flexible damped bearing is employed to support a relatively heavy rotor structure, as typically found in turbine or compressor applications, the weight of the rotor is such as to place a high unidirectional static preload upon the bearing assembly which produces initial deformation in each of the flexure springs. As a result of this preloading, the movable support tends to sag in assembly and thus destroys the integrity of the film cavity.

At least one helper spring is herein provided within the assembly that is arranged to support the dead weight of the shaft and thus eliminate the harmful effects of the heavy rotor upon the flexure springs and the squeeze film cavity. As seen in FIGS. 1 and 2, the helper spring is carried in an elongated groove 42 formed in the inner wall 43 of the bearing housing 15. Although the helper spring can take any suitable form, it is preferred that the spring be an elongated beam 45 that is axially aligned with rotor shaft 11. As more clearly shown in FIG. 2, the beam is mounted in the housing groove directly below the movable member 16. The two extreme ends of the beam are provided with raised support pads 47, 48 which rest upon the bearing housing to suspend the beam therebetween. The upper surface of the beam is also provided with a centrally located reaction pad 50 adapted to contact the outer periphery of the moving member. In practice, the beam is positioned so that the reaction pad acts about the vertical centerline of the bearing shoes carried within the movable member. The depth of the elongated groove housing the beam is such that the beam is prestressed in assembly to provide a continuous biasing force against the movable member to offset the dead weight of the rotor structure.

Although a single helper spring is shown in the preferred embodiment of the present invention, it should be understood that a plurality of similar helper springs can be similarly employed without departing from the teachings of the present invention. For instance, a pair of helper springs can be mounted below the horizontal centerline of the shaft at approximately 30° from the vertical centerline thereof which act in concert to support the dead weight of the rotor.

While this invention has been described with reference to the structure herein disclosed, it is not confined to the details as set forth and this application is intended to cover any modifications or changes as may come within the scope of the following claims.

What is claimed is:

1. In a flexible damped bearing assembly, for rotatably supporting a generally horizontally aligned rotor shaft, of the type wherein the bearing is mounted within a movable member suspended from a stationary member upon a series of resilient springs and having a fluid film acting between the movable member and the stationary member for damping the bearing reaction to the shaft, the improvement comprising
a helper spring positioned beneath the horizontal centerline of the shaft being arranged to act between the stationary member and the movable member to support the weight of the rotor acting upon the bearing, the spring being a beam having a raised support pad at each end arranged to seat against one of said members and a raised reaction pad at the approximate center of the beam arranged to seat in contact against the other of said members.

2. The bearing assembly of claim 1 wherein the beam is prestressed in assembly to provide a biasing force sufficient to offset the static load of the rotor acting upon the bearing.

3. The bearing assembly of claim 2 wherein the reaction pad is positioned to act against the bearing at the approximate axial center of the bearing.

4. A bearing assembly for rotatably supporting a horizontally aligned rotor structure within a stationary machine frame including
a bearing for rotatably supporting the shaft of the rotor structure,
a movable member for supporting the bearing in reference to the shaft, the movable member being suspended from the machine frame upon a plurality of flexure springs circumferentially spaced about the movable member,
a uniform fluid squeeze film maintained between the movable member and the stationary frame for damping the bearing, and
a plurality of helper springs positioned beneath the horizontal centerline of the shaft, each spring comprising a beam axially aligned with the shaft having a raised support pad at each end thereof arranged to seat in contact against the machine frame and a raised reaction pad arranged to seat in contact against the movable member, the springs acting in concert to support the static load of the rotor acting upon the bearing.

5. The bearing assembly of claim 4 wherein the reaction pad of each beam is located at the approximate center of the beam and is arranged to act against the movable member at the approximate center of the bearing supported therein.

6. The bearing assembly of claim 5 wherein the springs are preloaded in assembly to bias the movable member with a force substantially equal to the static load of the rotor acting upon the bearing.

7. The bearing assembly of claim 4 having two helper springs positioned equidistant from the vertical centerline of the bearing.

8. The bearing assembly of claim 7 wherein each helper spring is approximately 30° from the vertical centerline of the bearing.

* * * * *